(12) United States Patent
Ham et al.

(10) Patent No.: US 11,091,624 B2
(45) Date of Patent: Aug. 17, 2021

(54) THERMOPLASTIC RESIN COMPOSITION AND ARTICLE PRODUCED THEREFROM

(71) Applicant: LOTTE ADVANCED MATERIALS CO., LTD., Yeosu-si (KR)

(72) Inventors: Min Kyoung Ham, Uiwang-si (KR); Dong Hyun Park, Uiwang-si (KR); Eun Joo Lee, Uiwang-si (KR); Young Chul Kwon, Uiwang-si (KR); Yun Jeong Yang, Uiwang-si (KR); Hyun Ji Oh, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 141 days.

(21) Appl. No.: 16/342,018

(22) PCT Filed: Dec. 21, 2017

(86) PCT No.: PCT/KR2017/015255
§ 371 (c)(1),
(2) Date: Apr. 15, 2019

(87) PCT Pub. No.: WO2018/124639
PCT Pub. Date: Jul. 5, 2018

(65) Prior Publication Data
US 2019/0249001 A1 Aug. 15, 2019

(30) Foreign Application Priority Data

Dec. 27, 2016 (KR) .......................... 10-2016-0179615
Dec. 21, 2017 (KR) .......................... 10-2017-0176909

(51) Int. Cl.
*C08L 51/04* (2006.01)
*C08K 3/22* (2006.01)
*C08L 25/08* (2006.01)
*C08L 55/02* (2006.01)
*C08L 25/12* (2006.01)

(52) U.S. Cl.
CPC .............. *C08L 51/04* (2013.01); *C08K 3/22* (2013.01); *C08L 25/08* (2013.01); *C08L 25/12* (2013.01); *C08L 55/02* (2013.01); *C08K 2003/2296* (2013.01); *C08L 2205/03* (2013.01); *C08L 2312/00* (2013.01)

(58) Field of Classification Search
CPC .......................... C08K 2003/2296; C08L 25/12
See application file for complete search history.

(56) References Cited

U.S. PATENT DOCUMENTS

| | | | | |
|---|---|---|---|---|
| 3,944,631 A | * | 3/1976 | Yu ......................... | C08F 285/00 525/305 |
| 4,329,310 A | * | 5/1982 | Turczyk .................. | B29C 48/94 264/211 |
| 5,906,679 A | * | 5/1999 | Watanabe .............. | B82Y 30/00 106/286.6 |
| 5,990,239 A | | 11/1999 | Chang et al. | |
| 9,376,319 B2 | | 6/2016 | Sueda et al. | |
| 2015/0011709 A1 | | 1/2015 | Ahn et al. | |
| 2016/0152806 A1 | * | 6/2016 | Park ...................... | C08F 265/04 523/201 |

FOREIGN PATENT DOCUMENTS

| | | |
|---|---|---|
| JP | 08-505858 | 6/1996 |
| JP | 11-035787 | 2/1999 |
| JP | 11-263705 | 9/1999 |
| KR | 10-2008-0062201 A | 7/2008 |
| KR | 10-0988999 B1 | 10/2010 |
| KR | 10-1132143 B1 | 4/2012 |
| KR | 10-1334283 B1 | 11/2013 |
| WO | 94/015462 A1 | 7/1994 |
| WO | 2012-169611 A1 | 12/2012 |
| WO | 2018/124639 A2 | 7/2018 |

OTHER PUBLICATIONS

International Search Report in counterpart International Application No. PCT/KR2017/015255 dated Oct. 11, 2018, pp. 1-4.
Prasanna et al., "Insight into the Mechanism of Antibacterial Activity of ZnO: Surface Defects Mediated Reactive Oxygen Species Even in the Dark", Langmuir 2015, vol. 31, pp. 9155-9162 (Jul. 29, 2015).
Prasanna et al., Supplementary Material "Insight into the Mechanism of Antibacterial Activity of ZnO: Surface Defects Mediated Reactive Oxygen Species Even in the Dark", Langmuir 2015, vol. 31, pp. 1-6 (Jul. 29, 2015).
Extended Search Report in counterpart European Application No. 17887388.1 dated Jul. 10, 2020, pp. 1-6.

* cited by examiner

*Primary Examiner* — Vickey Nerangis
(74) *Attorney, Agent, or Firm* — Additon, Pendleton & Witherspoon, P.A.

(57) ABSTRACT

A thermoplastic resin composition of the present invention comprises: a thermoplastic resin comprising an acrylate rubber-modified vinyl graft copolymer and an aromatic vinyl copolymer resin; a crosslinked aromatic vinyl copolymer resin; and zinc oxide having an average particle size of about 0.3 to 3 μm and a BET specific surface area of about 1 to 10 m$^2$/g. The thermoplastic resin composition and the article formed therefrom are excellent in low-glossiness, weather resistance, antibacterial properties, etc.

13 Claims, No Drawings

THERMOPLASTIC RESIN COMPOSITION AND ARTICLE PRODUCED THEREFROM

CROSS-REFERENCE TO RELATED APPLICATIONS

This application claims priority to and the benefit of International Application No. PCT/KR2017/015255, filed Dec. 21, 2017, which published as WO 2018/124639 on Jul. 5, 2018; Korean Patent Application No. 10-2016-0179615, filed in the Korean Intellectual Property Office on Dec. 27, 2016; and Korean Patent Application No. 10-2017-0176909 filed in the Korean Intellectual Property Office on Dec. 21, 2017, the entire disclosure of each of which is incorporated herein by reference.

TECHNICAL FIELD

The present invention relates to a thermoplastic resin composition and a molded article produced therefrom. More particularly, the present invention relates to a thermoplastic resin composition that exhibits good properties in terms of low gloss, weather resistance, antibacterial properties, etc., and a molded article produced therefrom.

BACKGROUND ART

An acrylate-based rubber-modified aromatic vinyl graft copolymer resin, such as an acrylate-styrene-acrylonitrile copolymer (ASA) resin, has better weather resistance (discoloration resistance) than a diene-based rubber-modified aromatic vinyl copolymer resin, such as an acrylonitrile-butadiene-styrene copolymer resin (ABS resin), and is broadly used as interior/exterior materials of electric/electronic products and automobiles, exterior materials of buildings, and the like, which require weather resistance.

When such an acrylate-based rubber-modified aromatic vinyl graft copolymer resin is used for a swimming pool floor, a bathtub, a deck, and the like, the copolymer resin is required to have low gloss in order to reduce glare caused by aesthetic effects and water drops, and is also required to have antibacterial properties due to direct or indirect contact with the body.

Further, in order to improve weather resistance of the acrylate-based rubber-modified aromatic vinyl graft copolymer resin, a weathering stabilizer is added to the copolymer resin or the content of an acrylate-based rubber polymer is increased therein. However, an excess of the weathering stabilizer can cause deterioration in external appearance and mechanical properties due to gas generation and the like, and an excess of the acrylate-based rubber polymer can cause deterioration in property balance.

Therefore, there is a need for a thermoplastic resin composition that can secure good properties in terms of low gloss, weather resistance, antibacterial properties, and the like without deterioration in other inherent properties thereof.

The background technique of the present invention is disclosed in Korean Patent Registration No. 10-0988999 and the like.

DISCLOSURE

Technical Problem

It is an object of the present invention to provide a thermoplastic resin composition exhibiting good properties in terms of low gloss, weather resistance, antibacterial properties, and the like.

It is another object of the present invention to provide a molded article produced from the thermoplastic resin composition.

The above and other objects of the present invention can be achieved by the present invention described below.

Technical Solution

One aspect of the present invention relates to a thermoplastic resin composition. The thermoplastic resin composition may include: a thermoplastic resin including an acrylate-based rubber-modified vinyl graft copolymer and an aromatic vinyl copolymer resin; a crosslinked aromatic vinyl copolymer resin; and zinc oxide having an average particle diameter of about 0.3 μm to about 3 μm and a BET specific surface area of about 1 m²/g to about 10 m²/g.

In one embodiment, the thermoplastic resin composition may include: about 100 parts by weight of the thermoplastic resin including about 20% by weight (wt %) to about 80 wt % of the acrylate-based rubber-modified vinyl graft copolymer and about 20 wt % to about 80 wt % of the aromatic vinyl copolymer resin; about 0.5 parts by weight to about 15 parts by weight of the crosslinked aromatic vinyl copolymer resin; and about 0.3 parts by weight to about 10 parts by weight of the zinc oxide.

In one embodiment, the acrylate-based rubber-modified vinyl graft copolymer may be prepared by graft polymerization of a monomer mixture including an aromatic vinyl monomer and a vinyl cyanide monomer to an acrylate rubber polymer having an average particle diameter of about 350 nm to about 600 nm.

In one embodiment, the aromatic vinyl copolymer resin may be a polymer of an aromatic vinyl monomer and a monomer copolymerizable with the aromatic vinyl monomer.

In one embodiment, the crosslinked aromatic vinyl copolymer resin may be a polymer of a reaction mixture including about 40 wt % to about 80 wt % of an aromatic vinyl monomer; about 5 wt % to about 20 wt % of a vinyl cyanide monomer; and about 10 wt % to about 40 wt % of a crosslinking agent.

In one embodiment, the zinc oxide may have a peak intensity ratio (B/A) of about 0 to about 1, where A indicates a peak in the wavelength range of 370 nm to 390 nm and B indicates a peak in the wavelength range of 450 nm to 600 nm.

In one embodiment, the zinc oxide may have a peak position (2θ) in the range of 35° to 37° in X-ray diffraction (XRD) analysis and a crystallite size of about 1,000 Å to about 2,000 Å, as calculated by Equation 1:

$$\text{Crystallite size}(D) = \frac{K\lambda}{\beta \cos \theta} \qquad \text{[Equation 1]}$$

where K is a shape factor, λ is an X-ray wavelength, β is an FWHM value (degree) of an X-ray diffraction peak, and θ is a peak position degree.

In one embodiment, the crosslinked aromatic vinyl copolymer resin and the zinc oxide may be present in a weight ratio (crosslinked aromatic vinyl copolymer resin:zinc oxide) of about 1:0.03 to about 1:20.

In one embodiment, the thermoplastic resin composition may have a gloss of about 1% to about 55%, as measured at an angle of 60° in accordance with ASTM D523.

In one embodiment, the thermoplastic resin composition may have a color difference (ΔE) of about 0 to about 5, as calculated by Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weathering test for 3,000 hours in accordance with SAE J 1960:

$$\text{Color difference } (\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before/after weathering test; Δa is a difference ($a_1^* - a_0^*$) between a* values before/after weathering test; and Δb is a difference ($b_1^* - b_0^*$) between b* values before/after weathering test.

In one embodiment, the thermoplastic resin composition may have an antibacterial activity against *Staphylococcus aureus* of about 2 to about 7 and an antibacterial activity against *Escherichia coli* of about 2 to about 7, as measured on 5 cm×5 cm specimens in accordance with JIS Z 2801 after inoculation with *Staphylococcus aureus* and *Escherichia coli*, respectively, followed by culturing under conditions of 35° C. and 90% RH (relative humidity) for 24 hours.

Another aspect of the present invention relates to a molded article. The molded article is formed of the thermoplastic resin composition as set forth above.

Advantageous Effects

The present invention provides a thermoplastic resin composition that has good properties in terms of low gloss, weather resistance, antibacterial properties, and the like, and a molded article produced therefrom.

BEST MODE

Hereinafter, embodiments of the present invention will be described in detail.

A thermoplastic resin composition according to the present invention includes: (A) a thermoplastic resin including (A1) a rubber-modified vinyl graft copolymer and (A2) an aromatic vinyl copolymer resin; (B) a crosslinked aromatic vinyl copolymer resin; and (C) zinc oxide.

(A) Thermoplastic Resin

The thermoplastic resin according to the present invention may be an acrylate-based rubber-modified vinyl graft copolymer resin, which includes (A1) the acrylate-based rubber-modified vinyl graft copolymer and (A2) the aromatic vinyl copolymer resin.

(A1) Acrylate-Based Rubber-Modified Aromatic Vinyl Graft Copolymer

The acrylate-based rubber-modified vinyl graft copolymer according to one embodiment of the invention serves to improve weather resistance, lower gloss and impact resistance of the thermoplastic resin composition, and may be prepared by graft polymerization of a monomer mixture including an aromatic vinyl monomer and a vinyl cyanide monomer to an acrylate-based rubber polymer. For example, the acrylate-based rubber-modified vinyl graft copolymer may be obtained by graft polymerization of the monomer mixture including the aromatic vinyl monomer and the vinyl cyanide monomer to the acrylate-based rubber polymer, and the monomer mixture may further include a monomer for imparting processability and heat resistance. Here, polymerization may be performed by any typical polymerization method, such as emulsion polymerization, suspension polymerization, and the like. In addition, the acrylate-based rubber-modified vinyl graft copolymer may form a core (rubber polymer)-shell (copolymer of the monomer mixture) structure, without being limited thereto.

Examples of the acrylate-based rubber polymer may include an alkyl (meth)acrylate rubber, a copolymer of an alkyl (meth)acrylate and an aromatic vinyl monomer, and the like. These may be used alone or as a mixture thereof. For example, the acrylate-based rubber polymer may include a $C_2$ to $C_{10}$ alkyl acrylate rubber, a copolymer of a $C_2$ to $C_{10}$ alkyl acrylate and styrene, and a combination thereof, specifically a butyl acrylate rubber, a copolymer of butyl acrylate and styrene, and a combination thereof. Here, the copolymer of the alkyl (meth)acrylate and the aromatic vinyl monomer may be obtained by polymerization of about 70 wt % to about 90 wt % of the alkyl(meth)acrylate and about 10 to about 30 wt % of the aromatic vinyl monomer, without being limited thereto.

In some embodiments, the acrylate-based rubber polymer (rubber particles) may have an average particle diameter of about 350 nm to about 600 nm, for example, about 390 nm to about 500 nm, as measured using a particle analyzer (Malvern DLS, Nano ZS). Within this range, the thermoplastic resin composition can exhibit good properties in terms of low gloss, weather resistance, impact resistance, and the like.

In some embodiments, the acrylate-based rubber polymer may be present in an amount of about 20 wt % to about 70 wt %, for example, about 30 wt % to about 60 wt %, based on 100 wt % of the rubber-modified vinyl graft copolymer, and the monomer mixture (including the aromatic vinyl monomer and the vinyl cyanide monomer) may be present in an amount of about 30 wt % to about 80 wt %, for example, about 40 wt % to about 70 wt %, based on 100 wt % of the acrylate-based rubber-modified vinyl graft copolymer. Within this range, the thermoplastic resin composition can exhibit good properties in terms of low gloss, external appearance, weather resistance, impact resistance, and the like.

In some embodiments, the aromatic vinyl monomer may be graft copolymerizable with the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 10 to about 90 wt %, for example, about 40 wt % to about 90 wt %, based on 100 wt % of the monomer mixture. Within this range, the thermoplastic resin composition can exhibit good properties in terms of processability, impact resistance, and the like.

In some embodiments, the vinyl cyanide monomer is copolymerizable with the aromatic vinyl monomer, and may include acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile and methacrylonitrile. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good properties in terms of chemical resistance, mechanical properties, and the like.

Examples of the monomer for imparting processability and heat resistance may include (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the acrylate-based rubber-modified vinyl graft copolymer may be an acrylate-styrene-acrylonitrile graft copolymer (g-ASA) and the like.

In some embodiments, the acrylate-based rubber-modified vinyl graft copolymer may be present in an amount of about 20 wt % to about 80 wt %, for example, about 30 wt % to about 70 wt %, specifically about 50 to about 70 wt %, based on 100 wt % of the thermoplastic resin (the acrylate-based rubber-modified vinyl graft copolymer and the aromatic vinyl copolymer resin). Within this range, the thermoplastic resin composition can exhibit good properties in terms of low gloss, external appearance, weather resistance, impact resistance, fluidity (formability), and balance therebetween.

(A2) Aromatic Vinyl Copolymer Resin

The aromatic vinyl copolymer resin according to one embodiment of the invention may be an aromatic vinyl copolymer resin used for a typical rubber-modified vinyl graft copolymer resin. For example, the aromatic vinyl copolymer resin may be a polymer of a monomer mixture including an aromatic vinyl monomer and a monomer copolymerizable with the aromatic vinyl monomer, such as a vinyl cyanide monomer.

In some embodiments, the aromatic vinyl copolymer resin may be prepared by mixing the aromatic vinyl monomer and the monomer copolymerizable with the aromatic vinyl monomer, followed by polymerization. Here, polymerization may be carried out by any well-known polymerization method, such as emulsion polymerization, suspension polymerization, bulk polymerization, and the like.

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good properties in terms of impact resistance, fluidity, and the like.

In some embodiments, the monomer copolymerizable with the aromatic vinyl monomer may be a vinyl cyanide monomer, for example, acrylonitrile, methacrylonitrile, ethacrylonitrile, phenylacrylonitrile, α-chloroacrylonitrile, and fumaronitrile. These may be used alone or as a mixture thereof. The monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good properties in terms of impact resistance, fluidity, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of mechanical strength, formability, and the like.

In some embodiments, the aromatic vinyl copolymer resin may be present in an amount of about 20 wt % to about 80 wt %, for example, about 30 wt % to about 70 wt %, specifically about 30 wt % to about 50 wt %, based on 100 wt % of the thermoplastic resin. Within this range, the thermoplastic resin composition can exhibit good properties in terms of impact resistance, fluidity (formability), and the like.

(B) Crosslinked Aromatic Vinyl Copolymer Resin

The crosslinked aromatic vinyl copolymer resin according to one embodiment of the invention serves to improve low gloss, weather resistance, and antibacterial properties of the thermoplastic resin composition (specimen) together with zinc oxide. For example, the crosslinked aromatic vinyl copolymer resin may be a polymer of a monomer mixture including an aromatic vinyl monomer, a vinyl cyanide monomer, and a crosslinking agent.

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 40 wt % to about 80 wt %, for example, about 45 wt % to about 75 wt %, based on 100 wt % of the crosslinked aromatic vinyl copolymer resin. Within this range, the thermoplastic resin composition can exhibit good properties in terms of low gloss and the like.

Examples of the vinyl cyanide monomer may include acrylonitrile, methacrylonitrile, ethacrylonitrile, phenylacrylonitrile, α-chloroacrylonitrile, and fumaronitrile. These may be used alone or as a mixture thereof. The vinyl cyanide monomer may be present in an amount of about 5 wt % to about 20 wt %, for example, about 5 wt % to about 15 wt %, based on 100 wt % of the crosslinked aromatic vinyl copolymer resin. Within this range, the thermoplastic resin composition can exhibit good properties in terms of low gloss and the like.

In some embodiments, the crosslinking agent may include at least one selected from the group consisting of divinylbenzene, ethylene glycol di(meth)acrylate, allyl (meth)acrylate, diallyl phthalate, diallyl maleate, triallyl isocyanurate, and combinations thereof. The crosslinking agent may be present in an amount of about 10 wt % to about 40 wt %, for example, about 15 wt % to about 35 wt %, based on 100 wt % of the crosslinked aromatic vinyl copolymer resin. Within this range, the thermoplastic resin composition can exhibit good properties in terms of low gloss and the like.

In some embodiments, the crosslinked aromatic vinyl copolymer resin may be prepared by any typical polymerization method, such as emulsion polymerization, suspension polymerization, and solution polymerization, without being limited thereto. For example, emulsion polymerization, suspension polymerization, and the like may be used. Specifically, the crosslinked aromatic vinyl copolymer resin can be prepared by adding a polymerization initiator and a chain transfer agent to the mixture prepared in the aforementioned amount to prepare a reaction mixture, followed by adding the reaction mixture to an aqueous solution having a suspension stabilizer dissolved therein. The polymerization temperature and time can be suitably regulated. For example, polymerization may be performed at a polymerization temperature of about 65° C. to about 125° C., specifically about 70° C. to about 120° C., for about 1 to about 8 hours.

The polymerization initiator may be selected from any typical radical initiators known in the art and may include, for example, octanoyl peroxide, decanoyl peroxide, lauroyl peroxide, benzoyl peroxide, monochlorobenzoyl peroxide, dichlorobenzoyl peroxide, p-methylbenzoyl peroxide, tert-butyl perbenzoate, azobisisobutyronitrile, and azobis-(2,4-dimethyl)-valeronitrile, without being limited thereto. These polymerization initiators may be used alone or as a mixture thereof. The polymerization initiator may be present in an amount of about 0.01 to about 10 parts by weight, for example, about 0.03 to about 5 parts by weight, relative to 100 parts by weight of the reaction mixture, without being limited thereto.

The chain transfer agent serves to control the weight average molecular weight of the crosslinked aromatic vinyl copolymer resin while improving thermal stability thereof. The chain transfer agent may include any typical chain transfer agent known in the art, for example, alkyl mercaptans represented by $CH_3(CH_2)_nSH$ (n being an integer of 1 to 20), such as n-butyl mercaptan, n-octyl mercaptan, n-dodecyl mercaptan, t-dodecyl mercaptan, isopropyl mercaptan, and n-amyl mercaptan; halogen compounds, such as carbon tetrachloride; and aromatic compounds, such as α-methyl styrene dimer or α-ethyl styrene dimer, without being limited thereto. These compounds may be used alone or as a mixture thereof. The chain transfer agent may be present in an amount of about 0.01 to about 10 parts by weight, for example, about 0.02 to about 5 parts by weight, relative to about 100 parts by weight of the reaction mixture. Within this range, the crosslinked aromatic vinyl copolymer resin can be prepared to have high thermal stability and appropriate molecular weight.

In some embodiments, the crosslinked aromatic vinyl copolymer resin may be prepared through a process in which the reaction mixture is introduced into an aqueous solution containing at least one additive selected from among a suspension stabilizer, a suspension stabilization aid, and the like, followed by polymerization. The additive may be present in an amount of about 0.001 to about 20 parts by weight relative to about 100 parts by weight of the reaction mixture, without being limited thereto.

Examples of the suspension stabilizer may include: organic suspension stabilizers, such as homopolymers or copolymers of acrylic acid or methacrylic acid, polyalkyl acrylate-acrylic acid, polyolefin-maleic acid, polyvinyl alcohol, and cellulose; inorganic suspension stabilizers, such as tricalcium phosphate; and mixtures thereof, without being limited thereto. Here, the acrylic acid or methacrylic acid may be in the form of a salt of sodium, potassium, or ammonium to provide appropriate solubility.

Examples of the suspension stabilization aid may include disodium hydrogen phosphate and sodium dihydrogen phosphate. In addition, in order to control solubility of a water-soluble polymer or monomer, for example, sodium sulfate may be added to the crosslinked aromatic vinyl copolymer resin.

After completion of polymerization, the crosslinked aromatic vinyl copolymer resin may be produced in particle form through cooling, cleaning, dehydrating, drying, and the like.

In some embodiments, the crosslinked aromatic vinyl copolymer resin may be present in an amount of about 0.5 to about 15 parts by weight, for example, about 1 to about 10 parts by weight, specifically about 3 to about 8 parts by weight, relative to about 100 parts by weight of the thermoplastic resin. Within this range, the thermoplastic resin composition can exhibit good properties in terms of low gloss, weather resistance, antibacterial properties, and the like.

(C) Zinc Oxide

The zinc oxide according to the present invention serves to improve weather resistance, antibacterial properties, and low gloss of the thermoplastic resin composition together with a UV stabilizer, and may have an average particle diameter of about 0.3 μm to about 3 μm, for example, about 0.5 μm to about 2 μm, as measured using a particle analyzer, a BET specific surface area of about 1 m²/g to about 10 m²/g, for example, about 1 m²/g to about 7 m²/g, and a purity of about 99% or higher. If these parameters of the zinc oxide are outside these ranges, the thermoplastic resin composition can have poor properties in terms of weather resistance, antibacterial properties and the like.

In some embodiments, the zinc oxide may have a peak intensity ratio (B/A) of about 0 to about 1, for example, about 0.1 to about 1, where A indicates a peak in the wavelength range of 370 nm to 390 nm and B indicates a peak in the wavelength range of 450 nm to 600 nm in photoluminescence measurement. Within this range, the thermoplastic resin composition can have further improved properties in terms of weather resistance, antibacterial properties, and the like.

In some embodiments, the zinc oxide may have a peak position degree (2θ) in the range of 35° to 37° and a crystallite size of about 1,000 Å to about 2,000 Å, for example, about 1,200 Å to about 1,800 Å, in X-ray diffraction (XRD) analysis, as calculated by Scherrer's Equation (Equation 1) with reference to a measured FWHM value (full width at half maximum of a diffraction peak). Within this range, the thermoplastic resin composition can have good properties in terms of initial color, weather resistance, antibacterial properties, and the like.

$$\text{Crystallite size}(D) = \frac{K\lambda}{\beta \cos \theta} \quad \text{[Equation 1]}$$

In the Equation 1, K is a shape factor, λ is an X-ray wavelength, β is an FWHM value (degree) of an X-ray diffraction peak, and θ is a peak position degree.

In some embodiments, the zinc oxide may be prepared by melting zinc particles in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., heating the reactor to about 700° C. to about 800° C. for about 30 minutes to about 150 minutes while injecting nitrogen/hydrogen gas into the reactor, as needed, and cooling the reactor to room temperature (about 20° C. to about 30° C.).

In some embodiments, the zinc oxide may be present in an amount of about 0.3 to about 10 parts by weight, for example, about 0.5 to about 5 parts by weight, specifically about 0.5 to about 2.5 parts by weight, relative to about 100 parts by weight of the thermoplastic resin. Within this range, the thermoplastic resin composition can have good properties in terms of weather resistance, antibacterial properties, low gloss, and the like.

In some embodiments, the crosslinked aromatic vinyl copolymer resin (B) and the zinc oxide (C) may be present in a weight ratio (B:C) of about 1:0.03 to about 1:20, for example, about 1:0.08 to about 1:2. Within this range, the thermoplastic resin composition can have good properties in terms of low gloss, weather resistance, antibacterial properties, and the like.

According to one embodiment of the invention, the thermoplastic resin composition may further include additives used in typical thermoplastic resin compositions. Examples of the additives may include a weathering stabilizer, a flame retardant, fillers, an antioxidant agent, an anti-dipping agent, a lubricant, a release agent, a nucleating agent, an antistatic agent, a pigment, a dye, and a mixture thereof, without being limited thereto. The additives may be present in an amount of about 0.001 to about 40 parts by weight, for example, about 0.1 to about 10 parts by weight, relative to about 100 parts by weight of the thermoplastic resin.

According to one embodiment of the invention, the thermoplastic resin composition may be prepared in pellet form by mixing the aforementioned components, followed by melt extrusion using a typical twin-screw extruder at about 200° C. to about 280° C., for example, about 220° C. to about 250° C.

In some embodiments, the thermoplastic resin composition may have a gloss of about 1% to about 55%, for example, about 10 to about 50%, as measured at an angle of 60° in accordance with ASTM D523.

In some embodiments, the thermoplastic resin composition may have a color difference (ΔE) of about 0 to about 5, for example, about 1 to about 3, as calculated by Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weathering test for 3,000 hours in accordance with SAE J 1960.

$$\text{Color difference } (\Delta E) = \sqrt{(\Delta L^*)^2 + (\Delta a^*)^2 + (\Delta b^*)^2} \quad \text{[Equation 2]}$$

In the Equation 2, ΔL* is a difference ($L_1^* - L_0^*$) between L* values before/after weathering test; Δa is a difference ($a_1^* - a_0^*$) between a* values before/after weathering test; and Δb is a difference ($b_1^* - b_0^*$) between b* values before/after weathering test.

In some embodiments, the thermoplastic resin composition may have an antibacterial activity against *Staphylococcus aureus* of about 2 to about 7, for example, about 2.5 to about 6, and an antibacterial activity against *Escherichia coli* of about 2 to about 7, for example, about 2.5 to about 6, as measured on 5 cm×5 cm specimens in accordance with JIS Z 2801 after inoculation with *Staphylococcus aureus* and *Escherichia coli*, respectively, followed by culturing under conditions of 35° C. and 90% RH for 24 hours.

A molded article according to the present invention is produced from the thermoplastic resin composition. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles exhibit good properties in terms of low gloss, weather resistance, antibacterial properties, impact resistance, fluidity (formability), and balance therebetween, and thus may be used in various fields, such as interior/exterior materials for automobile parts or electric/electronic products, and exterior materials for buildings, for example, a swimming pool floor, a bathtub, a deck, and the like.

Mode for Invention

Next, the present invention will be described in more detail with reference to some examples. It should be understood that these examples are provided for illustration only and are not to be in any way construed as limiting the present invention.

EXAMPLE

Details of components used in Examples and Comparative Examples are as follows.

(A) Thermoplastic Resin

An acrylate-based rubber-modified vinyl graft copolymer resin comprising 60 wt % of (A1) an acrylate rubber-modified aromatic vinyl graft copolymer and 40 wt % of (A2) an aromatic vinyl copolymer resin was used.

(A1) Acrylate Rubber-Modified Aromatic Vinyl Graft Copolymer

A g-ASA copolymer obtained by grafting 55 wt % of a mixture comprising styrene and acrylonitrile (weight ratio: 75/25) to 45 wt % of butyl acrylate rubbers having an average particle size of 400 nm was used.

(A2) Aromatic Vinyl Copolymer Resin

A SAN resin (weight average molecular weight: 130,000 g/mol) obtained through polymerization of 71 wt % of styrene and 29 wt % of acrylonitrile was used.

(B) Crosslinked Aromatic Vinyl Copolymer Resin

A solution (a) was prepared by mixing 60 wt % of styrene, 10 wt % of acrylonitrile, 30 wt % of divinylbenzene (crosslinking agent), and 1.0 parts by weight of an initiator, and an aqueous solution (b) was prepared by completely dissolving 0.2 parts by weight of polyvinyl alcohol in water. The prepared two solutions were homogenized using a homogenizer at 500 rpm for 1 min, followed by polymerization at 90° C. for 7 hours in a four-neck flask under a nitrogen atmosphere. After filtering the prepared polymer, the resulting material was washed with water and dried in a vacuum oven for a day to prepare white spherical odorless particles, which were used as a crosslinked aromatic vinyl copolymer resin.

(C) Zinc Oxide ($C_1$) Metallic zinc was dissolved and heated to 900° C. to vaporize molten zinc in a reactor, followed by injecting oxygen gas into the reactor and cooling the reactor to room temperature (25° C.), thereby preparing a primary intermediate material. Then, the primary intermediate material was subjected to heat treatment at 700° C. for 90 minutes and cooled to room temperature (25°), thereby preparing zinc oxide.

($C_2$) Zinc oxide (Manufacturer: Ristecbiz Inc., Product Name: RZ-950) was used.

($C_3$) Zinc oxide (Manufacturer: Hanil Chemical Inc., Product Name: TE30) was used.

For each of the zinc oxides ($C_1$, $C_2$, $C_3$), an average particle diameter, a BET surface area, a purity, and a peak intensity ratio (B/A) of peak B in the wavelength range of 450 nm to 600 nm to peak A in the wavelength range of 370 nm to 390 nm in measurement of photoluminescence, and a crystallite size were measured and are shown in Table 1.

TABLE 1

|  | (C1) | (C2) | (C3) |
|---|---|---|---|
| Average particle diameter (μm) | 1.2 | 0.890 | 3.7 |
| BET surface area (m²/g) | 4 | 15 | 14 |
| Purity (%) | 99 | 97 | 97 |
| PL peak intensity ratio (B/A) | 0.28 | 9.8 | 9.5 |
| Crystallite size (Å) | 1,417 | 503 | 489 |

Property Evaluation (1) Average particle diameter (unit: μm): Average particle diameter (volume average) was measured using a particle analyzer (Laser Diffraction Particle Analyzer LS 13 320, Beckman Coulter Inc.).

(2) BET surface area (unit: m$^2$/g): BET surface area was measured by a nitrogen gas adsorption method using a BET analyzer (Surface Area and Porosity Analyzer ASAP 2020, Micromeritics Inc.).

(3) Purity (unit: %): Purity was measured by thermogravimetric analysis (TGA) based on the weight of the remaining material at 800° C.

(4) PL peak intensity ratio (B/A): Spectrum emitted upon irradiation of a specimen using a He-Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak A in the wavelength range of 370 nm to 390 nm to peak B in the wavelength range of 450 nm to 600 nm was measured. Here, an injection molded specimen was irradiated with laser beams without separate treatment upon PL analysis, and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used, and for more accurate analysis, the injection molded specimen was subjected to heat treatment at 600° C. in air for 2 hours to remove a polymer resin before XRD analysis.

$$\text{Crystallite size}(D) = \frac{K\lambda}{\beta\cos\theta} \quad \text{[Equation 1]}$$

In the Equation 1, K is a shape factor, λ is an X-ray wavelength, β is an FWHM value (degree) of an X-ray diffraction peak, and θ is a peak position degree.

Examples 1 to 5 and Comparative Examples 1 to 4

The above components were placed in amounts as listed in Tables 2 and 3 and subjected to extrusion at 230° C., thereby preparing pellets. Extrusion was performed using a twin-screw extruder (L/D=36, Φ: 45 mm). The prepared pellets were dried at 80° C. for 2 hours or more and injection-molded in a 6 oz. injection molding machine (molding temperature: 230° C., mold temperature: 60° C.), thereby preparing specimens. The prepared specimens were evaluated as to the following properties by the following method, and results are shown in Tables 2 and 3.

Property Evaluation (1) Gloss (surface gloss, unit: %): Gloss was measured on a specimen at 60° using a BYK-Gardner Gloss Meter (BYK) in accordance with ASTM D523.

(2) Weather resistance (color difference (ΔE)): Initial color values ($L_0^*$, $a_0^*$, $b_0^*$) were measured on an injection molded specimen having a size of 50 mm×90 mm×3 mm using a colorimeter (KONICA MINOLTA, CM-3700A) and was then subjected to weather resistance testing for 3,000 hours in accordance with SAE J 1960, followed by measurement of color values ($L_0^*$, $a_0^*$, $b_0^*$) using the colorimeter. Thereafter, a color difference (ΔE) was calculated according to Equation 2.

$$\text{Color difference }(\Delta E) = \sqrt{(\Delta L^*)^2 + (\Delta a^*)^2 + (\Delta b^*)^2} \quad \text{[Equation 2]}$$

In the Equation 2, ΔL* is a difference ($L_1^* - L_0^*$) between L* values before/after weathering test; Δa is a difference ($a_1^* - a_0^*$) between a* values before/after weathering test; and Δb is a difference ($b_1^* - b_0^*$) between b* values before/after weathering test.

(3) Antibacterial activity: Antibacterial activity was measured on a 5 cm×5 cm specimen obtained by inoculation with each of *Staphylococcus aureus* and *Escherichia coli*, followed by culturing under conditions of 35° C. and 90% RH for 24 hours, in accordance with JIS Z 2801.

(4) Notched Izod impact strength (unit: kgf·cm/cm): Izod impact strength was measured on a ⅛" thick notched Izod specimen in accordance with ASTM D256.

(5) Melt index (MI, unit: g/10 min): Melt index was measured under conditions of 220° C. and 10 kgf in accordance with ASTM D1238.

TABLE 2

|  |  | Example | | | | |
|---|---|---|---|---|---|---|
|  |  | 1 | 2 | 3 | 4 | 5 |
| (A) (parts by weight) |  | 100 | 100 | 100 | 100 | 100 |
| (B) (parts by weight) |  | 6 | 10 | 1 | 6 | 6 |
| (C) (parts by weight) | (C1) | 2 | 2 | 2 | 5 | 0.5 |
|  | (C2) | — | — | — | — | — |
|  | (C3) | — | — | — | — | — |
| Gloss (%) |  | 30 | 10 | 50 | 30 | 30 |
| Color difference (ΔE) |  | 1.8 | 2.0 | 1.9 | 1.3 | 3.0 |
| Antibacterial activity (*Escherichia coli*) |  | 6 | 6 | 6 | 6 | 2.5 |
| Antibacterial activity (*Staphylococcus*) |  | 6 | 4.5 | 6 | 6 | 2.5 |
| Notched Izod impact strength |  | 40 | 22 | 55 | 35 | 42 |
| Melt index |  | 3.0 | 2.5 | 3.2 | 3.3 | 2.9 |

TABLE 3

|  |  | Comparative Example | | | |
|---|---|---|---|---|---|
|  |  | 1 | 2 | 3 | 4 |
| (A) (parts by weight) |  | 100 | 100 | 100 | 100 |
| (B) (parts by weight) |  | — | 6 | 6 | 6 |
| (C) (parts by weight) | (C1) | 2 | — | — | — |
|  | (C2) | — | — | 2 | — |
|  | (C3) | — | — | — | 2 |
| Gloss (%) |  | 70 | 30 | 30 | 30 |
| Color difference (ΔE) |  | 1.8 | 4.0 | 2.5 | 2.0 |
| Antibacterial activity (*Escherichia coli*) |  | 6 | 0 | 1.5 | 1.5 |
| Antibacterial activity (*Staphylococcus*) |  | 6 | 0 | 1.5 | 1.5 |
| Notched Izod impact strength |  | 60 | 42 | 40 | 40 |
| Melt index |  | 3.5 | 3.0 | 3.0 | 3.0 |

From the results, it could be seen that the thermoplastic resin compositions according to the present invention exhibited good properties in terms of low gloss, weather resistance, antibacterial properties, and the like.

On the contrary, the thermoplastic resin composition of Comparative Example 1 prepared without using the cross-linked aromatic vinyl copolymer resin exhibited deterioration in low gloss due to high gloss; the thermoplastic resin composition of Comparative Example 1 prepared without using zinc oxide did not exhibit antibacterial properties and suffered from deterioration in weather resistance; and the thermoplastic resin compositions of Comparative Examples 3 and 4 prepared using the zinc oxides ($C_2$) and ($C_3$) instead of the zinc oxide ($C_1$) suffered from deterioration in antibacterial properties, weather resistance, and the like.

It should be understood that various modifications, changes, alterations, and equivalent embodiments can be made by those skilled in the art without departing from the spirit and scope of the present invention.

The invention claimed is:

1. A thermoplastic resin composition comprising:
   a thermoplastic resin comprising an acrylate-based rubber-modified vinyl graft copolymer and an aromatic vinyl copolymer resin;
   a crosslinked aromatic vinyl copolymer resin; and
   zinc oxide having an average particle diameter of about 0.3 μm to about 3 μm, a BET specific surface area of about 1 m²/g to about 10 m²/g, a peak position (2θ) in the range of 35° to 37° in X-ray diffraction (XRD) analysis, and a crystallite size of about 1,000 Å to about 2,000 Å, as calculated by Equation 1:

$$\text{Crystallite size}(D) = \frac{K\lambda}{\beta \cos\theta} \quad [\text{Equation 1}]$$

where K is a shape factor, λ is an X-ray wavelength, β is an FWHM value (degree) of an X-ray diffraction peak, and θ is a peak position degree.

2. The thermoplastic resin composition according to claim 1, wherein the thermoplastic resin composition comprises: about 100 parts by weight of the thermoplastic resin comprising about 20 wt % to about 80 wt % of the acrylate-based rubber-modified vinyl graft copolymer and about 20 wt % to about 80 wt % of the aromatic vinyl copolymer resin; about 0.5 to about 15 parts by weight of the crosslinked aromatic vinyl copolymer resin; and about 0.3 to about 10 parts by weight of the zinc oxide.

3. The thermoplastic resin composition according to claim 1, wherein the acrylate-based rubber-modified vinyl graft copolymer is prepared by graft polymerization of a monomer mixture comprising an aromatic vinyl monomer and a vinyl cyanide monomer to an acrylate rubber polymer having an average particle diameter of about 350 nm to about 600 nm.

4. The thermoplastic resin composition according to claim 1, wherein the aromatic vinyl copolymer resin is a polymer of an aromatic vinyl monomer and a vinyl cyanide monomer.

5. The thermoplastic resin composition according to claim 1, wherein the crosslinked aromatic vinyl copolymer resin is a polymer of a reaction mixture comprising about 40 wt % to about 80 wt % of an aromatic vinyl monomer; about 5 wt % to about 20 wt % of a vinyl cyanide monomer; and about 10 wt % to about 40 wt % of a crosslinking agent.

6. The thermoplastic resin composition according to claim 1, wherein the zinc oxide has a peak intensity ratio (B/A) of about 0.1 to about 1, where A indicates a peak in the wavelength range of 370 nm to 390 nm and B indicates a peak in the wavelength range of 450 nm to 600 nm.

7. The thermoplastic resin composition according to claim 1, wherein the crosslinked aromatic vinyl copolymer resin and the zinc oxide are present in a weight ratio (crosslinked aromatic vinyl copolymer resin:zinc oxide) of about 1:0.03 to about 1:20.

8. The thermoplastic resin composition according to claim 1, wherein the thermoplastic resin composition has a gloss of about 1% to about 55%, as measured at an angle of 60° in accordance with ASTM D523.

9. The thermoplastic resin composition according to claim 1, wherein the thermoplastic resin composition has a color difference (ΔE) of about 0 to about 5, as calculated by Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weathering test for 3,000 hours in accordance with SAE J 1960:

$$\text{Color difference } (\Delta E) = \sqrt{(66L^*)^2 + (\Delta a^*)^2 + (\Delta b^*)^2} \quad [\text{Equation 2}]$$

where ΔL* is a difference ($L_1^* - L_0^*$) between L* values before/after weathering test; Δa is a difference ($a_1^* \times a_0^*$) between a* values before/after weathering test; and Δb is a difference ($b_1^* - b_0^*$) between b* values before/after weathering test.

10. The thermoplastic resin composition according to claim 1, wherein the thermoplastic resin composition has an antibacterial activity against *Staphylococcus aureus* of about 2 to about 7 and an antibacterial activity against *Escherichia coli* of about 2 to about 7, as measured on 5 cm×5 cm specimens in accordance with JIS Z 2801 after inoculation with *Staphylococcus aureus* and *Escherichia coli*, respectively, followed by culturing under conditions of 35° C. and 90% RH for 24 hours.

11. The thermoplastic resin composition according to claim 1, wherein the thermoplastic resin composition has an antibacterial activity against *Staphylococcus aureus* of about 2.5 to about 6 and an antibacterial activity against *Escherichia coli* of about 2.5 to about 6, as measured on 5 cm×5 cm specimens in accordance with JIS Z 2801 after inoculation with *Staphylococcus aureus* and *Escherichia coli*, respectively, followed by culturing under conditions of 35° C. and 90% RH for 24 hours.

12. The thermoplastic resin composition according to claim 1, wherein the thermoplastic resin composition has a gloss of about 1% to about 55%, as measured at an angle of 60° in accordance with ASTM D523; a color difference (ΔE) of about 0 to about 5, as calculated by Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weathering test for 3,000 hours in accordance with SAE J 1960:

$$\text{Color difference } (\Delta E) = \sqrt{(\Delta L^*)^2 + (\Delta a^*)^2 + (66b^*)^2} \quad [\text{Equation 2}]$$

where ΔL* is a difference ($L_1^* - L_0^*$) between L* values before/after weathering test; Δa is a difference ($a_1^* - a_0^*$) between a* values before/after weathering test; and Δb is a difference ($b_1^* - b_0^*$) between b* values before/after weathering test; and an antibacterial activity against *Staphylococcus aureus* of about 2 to about 7 and an antibacterial activity against *Escherichia coli* of about 2 to about 7, as measured on 5 cm×5 cm specimens in accordance with JIS Z 2801 after inoculation with *Staphylococcus aureus* and *Escherichia coli*, respectively, followed by culturing under conditions of 35° C. and 90% RH for 24 hours.

13. A molded article produced from the thermoplastic resin composition according to claim 1.

* * * * *